Patented Aug. 23, 1932

1,873,115

UNITED STATES PATENT OFFICE

IRA H. DERBY AND ORIN D. CUNNINGHAM, OF INDIANAPOLIS, INDIANA, ASSIGNORS TO PETER C. REILLY, OF INDIANAPOLIS, INDIANA

PROCESS OF ORE FLOTATION

No Drawing. Original application filed March 19, 1926, Serial No. 96,061. Divided and this application filed December 30, 1930. Serial No. 505,666.

The present invention relates to improvements in ore flotation, including the flotation of sulfide ores, and other metalliferous material, by the use of nuclear phosphorus compounds containing sulfur; that is, compounds structurally consisting of groups of atoms united to one or more phosphorus atoms as a nucleus, which compounds also contain sulfur.

This application is a division of application Serial No. 96,061 filed in our joint names on the 19th day of March, 1926, and is designed to cover specifically flotation of ore or metalliferous material in the presence of a flotation reagent or compound comprising a reaction product of alcohol, phosphorus and sulfur, or stated in another way, an alcohol reconstructed with phosphorus and sulfur.

The invention is based upon our observation that organic compounds, which structurally consist of phosphorus as a nucleus to which the radicals are attached, and which contain sulfur, are excellent flotation agents and constitute a class of compounds that have not heretofore been used in the art of flotation.

More particularly, our present invention embraces the products of reaction of phosphorus sulfides (such as the trisulfide, $P_2S_3$, or pentasulfide, $P_2S_5$), with alcohols, and the use of such substances in ore flotation.

The reaction of the phosphorus sulfides, for example, phosphorus pentasulfide, $P_2S_5$, with alcohols, may result in the formation of a single chemical substance with two or more phosphorus atoms as a nucleus of the molecular structure, or there may be a splitting of the molecule of the phosphorus sulfide compound to yield two or more products, each containing one or more phosphorus nuclear atoms, or the reaction may or may not involve the elimination of some of the sulfur of the phosphorus sulfide by the substitution of groups of atoms (radicals), the resulting product or products being characterized, however, by the presence of a nuclear phosphorus atom or atoms and the presence of sulfur in the molecular structure.

These substances have a very high selective action or collecting power for metalliferous materials, such as sulfide minerals, in mineral flotation operations, but are lacking in frothing properties, so that any appropriate frothing agent (such, for example, as pine oil or tar acids), should be employed in conjunction therewith in carrying out the flotation operation. It is not necessary that chemically pure substances be used, since the unrefined products can be employed with metallurgical results equally good to those obtained with pure substances, or practically so.

The phosphosulfo compounds above referred to can be used either alone or mixed with other oily materials having flotation value, or with solvent agents or mixtures of the same.

Generally stated it is sufficient to select the desired alcohol, and to react thereupon with phosphorus pentasulfide or other sulfide of phosphorus, or even with a mixture of phosphorus and sulfur, or in some cases with phosphorus and sulfur added, separately in either order, the reaction being performed in a suitable container, and at a temperature sufficiently high to cause reaction to take place.

For the preparation of the phosphosulfo compounds referred to we give the following specific example:

One part of powdered phosphorus pentasulfide, $P_2S_5$, is mixed with three to four parts of ethyl alcohol and the mixture is then heated to 70° C., or thereabout, with constant stirring, and maintained at this temperature until the $P_2S_5$ has reacted with the alcohol to the extent that it disappears in solution. The product is a clear liquid.

The proportion of alcohol in the above example corresponds to an excess over that required for the reaction with phosphorus pentasulfide, the excess alcohol acting as a solvent or reaction medium which may be recovered, preferably by vacuum distillation, since continued heating at elevated temperature carries the reaction too far.

Instead of the procedure indicated in the above example, the alcohol may be brought up to the reaction temperature indicated and the phosphorus pentasulfide added slowly until the above proportion is obtained, or until no further reaction takes place.

In the example given above, pure chemicals were used, but crude chemicals may be used with equally good results, except that it is preferable to use anhydrous materials. We do not limit our claims to the quantity of reacting substances herein named.

The general procedure indicated in the above example may be applied in chemically combining phosphorus pentasulfide with any of the alcohols herein specified. In some instances heat may have to be applied to bring about the desired chemical combination, and in other cases the reaction mixture may desirably be cooled to carry on the reaction in the cold.

It is preferable not to separate the reaction products in the above example from the solvents but to use the product in its unrefined condition. In most cases they are sufficiently soluble in water so that in the flotation operation they are quickly dispersed as an aqueous solution throughout the pulp.

The products obtained by the reaction of the alcohols herein specified with phosphorus pentasulfide as illustrated in the above example, were employed in the flotation of a copper sulfide ore slime of the Utah Copper Company containing some copper oxides and analyzing about 0.9% copper, in the ratio of one-tenth pound of product per ton of dry ore, and tar acids as a frothing agent and a lime circuit being employed in conjunction therewith. The ore was subjected to the ordinary flotation operation in a mechanical agitation type of flotation machine and a tailing analyzing 0.06% copper was obtained, together with a high grade concentrate analyzing about 20% copper, corresponding to a recovery of about 95% of the copper value in the ore under treatment.

In other examples we have used both smaller and larger amounts of phosphosulfo compounds, in the flotation of ores, with satisfactory results, and we have also used phosphosulfo compounds both alone and with other flotation agents, with very satisfactory results. Furthermore, we do not limit our conditions for carrying out a flotation operation to those included in the above example, but may use any type of flotation machine, as for example, the Callow cell, or instead of an alkaline circuit, we may use a normal or acid circuit.

In this specification we have referred to the use of alcohol, such as ethyl alcohol. It is to be understood, however, that other alcohols or mixtures thereof, such as denatured alcohol, methyl, propyl, and higher alcohols, can likewise be employed.

What is claimed is:—

1. A process which comprises subjecting metalliferous material to froth flotation in the presence of a phosphorus sulfur compound of an alcohol.

2. A process which comprises subjecting metalliferous material to froth flotation while associated with a reaction product of a phosphorus compound of sulfur with an alcohol of the herein described class.

3. In the art of froth flotation, the herein described step of subjecting metalliferous material to flotation in the presence of a compound formed by reacting phosphorus sulfide with an unsubstituted aliphatic alcohol.

4. In the art of froth flotation, the herein described step of subjecting material to flotation in the presence of a compound formed by reacting phosphorus sulfide with an unsubstituted aliphatic alcohol.

5. In the art of froth flotation, the herein described step of subjecting metalliferous material to flotation in the presence of a compound formed by reacting phosphorus sulfide with an unsubstituted aliphatic alcohol containing not more than five carbon atoms.

6. In the art of froth flotation, the herein described step of subjecting metalliferous material to flotation in the presence of a reaction product of phosphorus pentasulfide with ethyl alcohol.

7. A process which comprises the froth flotation of a metalliferous material in the presence of a sulfur-phosphorus compound of an alcohol consisting solely of carbon, hydrogen and oxygen.

In testimony whereof we have signed our names to this specification.

IRA H. DERBY.
ORIN D. CUNNINGHAM.